G. W. CRAVENS.
ELECTRIC ARC WELDING OR BRAZING.
APPLICATION FILED JULY 23, 1915.
1,260,875.
Patented Mar. 26, 1918.
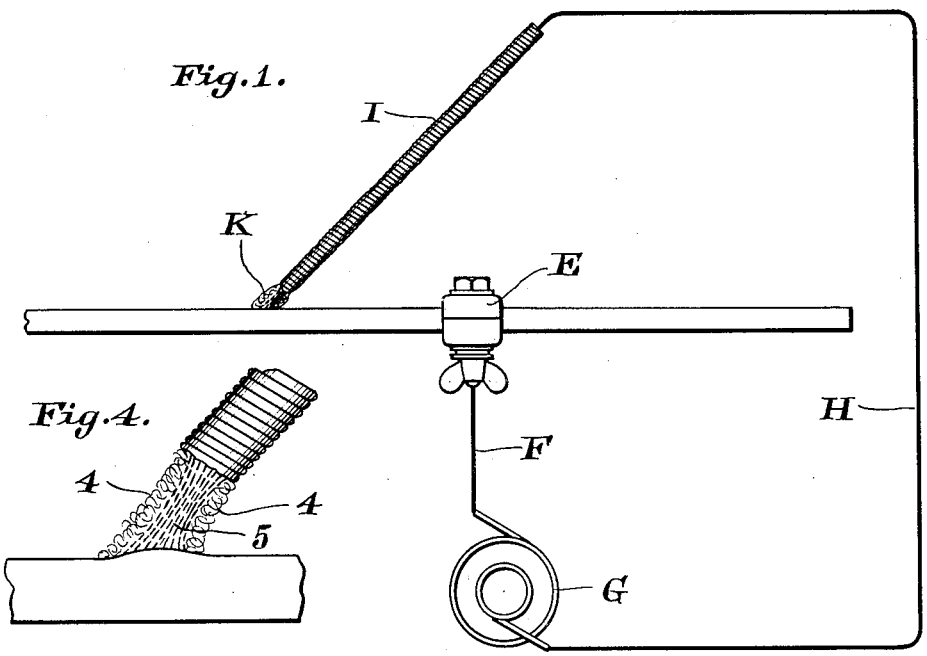
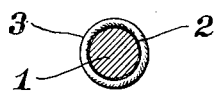
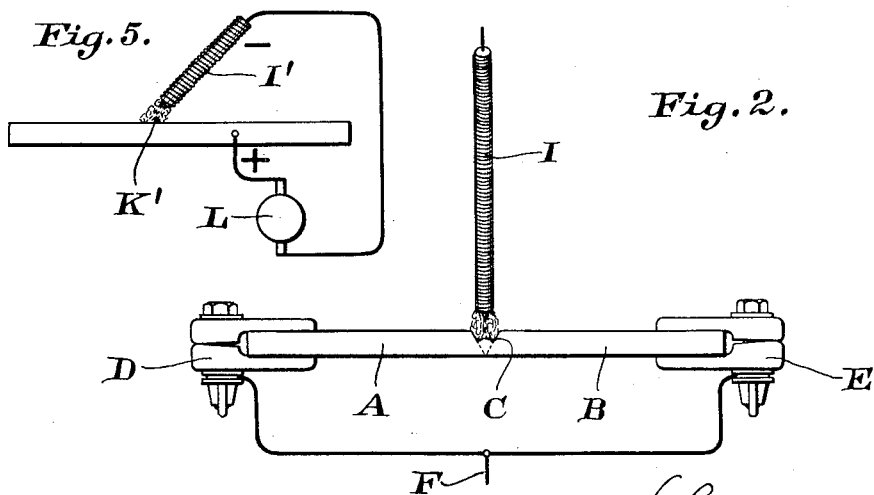
George W. Cravens Inventor
By his Attorney
Thomas Howe

UNITED STATES PATENT OFFICE.

GEORGE W. CRAVENS, OF WESTFIELD, NEW JERSEY, ASSIGNOR TO C. & C. ELECTRIC & MANUFACTURING COMPANY, OF GARWOOD, NEW JERSEY, A CORPORATION OF NEW JERSEY.

ELECTRIC-ARC WELDING OR BRAZING.

1,260,875.                    Specification of Letters Patent.    Patented Mar. 26, 1918.

Application filed July 23, 1915. Serial No. 41,469.

*To all whom it may concern:*

Be it known that I, GEORGE W. CRAVENS, a citizen of the United States, and resident of Westfield, in the county of Union and State of New Jersey, have invented certain new and useful Improvements in Electric-Arc Welding or Brazing, of which the following is a specification.

This invention relates to the brazing or welding together of metal pieces, through the instrumentality of the electric arc.

The invention is particularly useful in that class of electric welding or brazing wherein the work is one electrode and the other electrode is a metal rod or bar which is fused by the arc and flows into the joint, the arc being sprung between the bar and the work. In welding by this method the arc having been started, the movable bar constituting one electrode is moved along the joint, the arc heating the parts to be welded and also causing the fusion of the bar itself which flows into the joint and a secure welded or brazed joint is obtained.

In the practice of this character of welding or brazing, where direct current is used, the positive electrode develops a much larger amount of heat than the negative electrode. It is necessary, however, that the negative electrode be maintained at a high temperature. This necessitates special constructions or sizes of parts to conserve the cathode heat, when the movable electrode is the cathode.

Where alternating current is employed, the cathodes and anodes respectively of the arc change places many times a second so that substantially equal heats are generated at the work and at the movable electrode. Under such circumstances a relatively inefficient condition results. The alternating current arc is not persistent comparatively speaking, is particularly liable to discontinuance and consequent halting and unevenness of the welded or brazed work results.

According to the present invention the arc is surrounded or inclosed by a non-oxidizing, insulating, gaseous vapor envelop. This envelop confines the arc, prevents lateral diffusion and dissipation of heat.

The difficulties in the way of the use of an alternating current arc are thus removed so that this character of arc may be practically and efficiently used. Also with direct current, the electrode may be made the cathode and the heat thereat be so conserved that the necessary high temperature is maintained without unduly restricting the size of the electrode so that there is an abundance of metal for the brazing operation.

Furthermore the envelop prevents access of air to the metal vapors of the arc and, the protecting envelop itself being non-oxidizing, the molten metal and metal vapors which enter into the brazing or welding are maintained free from oxids so that a clean weld or braze free from these impurities is obtained.

This gaseous inclosing envelop may be formed by coating the movable electrode with insulating material which is adapted when heated by the arc to form a non-oxidizing insulating vapor about the arc between the metal of the electrode and the work. The arc having been sprung, the metal conductor will be fused or vaporized and flow into the weld, but as the conductor is eaten back the edges of the covering will be subjected to the heat of the arc and vaporized to form the envelop. The envelop being thus formed as the conductor is consumed the gaseous envelop is at all times present about the metallic arc.

A coated electrode laid down on the work along the joint to be brazed or welded will not accomplish the desired results for the reason that under such circumstances any vapor which may be formed from the coating will not be carried co-extensively with the arc, but at best will only occupy portions of the exterior surface of the metallic arc. To secure the carrying of the non-oxidizing insulating vapor formed from the coating to a distance co-extensive with the metallic arc, and the desired inclosure of that arc by the vapor, the movable conductor carrying the coating must be held at an angle to the joint or other work. This angle may vary between 90° and a minimum which may be approximated at 30°. The minimum angle at which the desired inclosure is obtained may be considerably less than 30° or it may be more than 30° under some conditions of operation. It can be readily ascertained by the operator by placing the electrode so that it makes a very small angle, say 5°, and then gradually increasing it. The point at which the desired inclosure is effected will be indicated by the comparative smoothness and non-sputtering of the arc.

It is often of advantage to alloy the metal of the weld or braze in such manner as to affect its characteristics. For instance, it is of advantage in many cases, and the character of the weld is improved, if a small amount of aluminum is added to the metal of the weld or braze.

It is a further object of the invention to provide means for adding such alloying metals. This is accomplished by coating the metal electrode with the alloying metal and then a coating from which the non-oxidizing arc inclosing vapor is formed may be placed outside this metallic coating. This brings the alloying metal next to the principal metal of the electrode at the arc so that the two metals may become readily intermingled while the vapor envelop is formed outside the whole.

In the accompanying drawings which illustrate the invention,

Figure 1 is a side elevation showing the application of the invention to the welding or brazing of a joint between two horizontal metal plates.

Fig. 2 is an end view of the apparatus shown in Fig. 1.

Fig. 3 is a cross section of the movable electrode.

Fig. 4 is a section on an enlarged scale through the arc showing the relation of the metallic arc and the non-oxidizing vapor envelop and Fig. 5 is a diagram showing the use of direct current.

Referring to the drawings, A and B are two flat horizontal plates, for instance of iron, which abut against each other at C along which the weld or braze is to be made. The plates are connected by means of clamps D and E and conductor F with one terminal of an alternating current generator G. The other terminal of the generator is connected by means of a conductor H with the movable electrode I between which and the work, that is plates A and B, the arc K is formed.

The electrode I comprises a metallic bar or rod 1 upon which is formed a fluxing coating 2 such as aluminum and outside of that is placed a covering 3 adapted to form a non-oxidizing insulating envelope for the arc when it is vaporized by the heat of the arc. This coating 3 may comprise a winding of cotton cord saturated with powdered plaster of Paris and sodium silicate which serves as a binder added. The cotton cord serves as a carrier for the plaster of Paris and sodium silicate and is consumed while the plaster of Paris and silicate are vaporized to form the envelop.

In making the weld the conductor of the electrode is brought in contact with the work and removed therefrom to draw the arc in the usual way. The rod 1 and its alloying metal 2 are melted or vaporized by the arc and flow into the joint, the work being also heated by the arc, and the weld or braze is formed. The coating 3 produces a vapor which incloses the metallic portion of the arc with the results as already indicated, the electrode I being held at an angle to the plates as before indicated. In the drawing the angle shown is approximately 45°. As the metal of the movable electrode is transferred to the joint under the action of the arc, the electrode is moved along the joint so that a continuous weld or braze is secured, the proper angle of the electrode with the work as before indicated, being maintained.

In Fig. 4 the outer non-oxidizing envelop is indicated by spiral lines and designated by the numeral 4 and the inclosed metallic arc represented by the dotted lines is designated by the reference numeral 5.

Referring now to Fig. 5, the direct current generator L has its positive terminal connected with the work and its negative terminal with the movable electrode I' of the same structure as the electrode I. The inclosed arc K' similar to K, is drawn between the work and the electrode I', the electrode being held at a proper angle as before indicated. The inclosure of the arc conserves the heat and maintains the necessary high temperature at the cathode as before referred to.

While the invention has been illustrated in what is believed to be its best applications, it may have other applications without departing from its spirit and is not therefore limited to the structures shown in the drawings.

What I claim is:

1. The method of electric arc welding or brazing which consists in establishing a welding or brazing arc inclosed in an insulating non-oxidizing vapor in welding or brazing proximity to the work.

2. The method of electric arc welding or brazing which consists in establishing an electric arc between the material to be welded or brazed and an electrode comprising a metal rod covered with an insulating material adapted to be converted by the arc into a non-oxidizing insulating vapor, said electrode being held out of engagement with and at an angle to the work at which said arc is inclosed by said vapor.

3. The method of electric arc welding or brazing which consists in establishing an electric arc between the material to be welded or brazed and an electrode comprising a metal rod covered with an insulating material adapted to be converted by the arc into a non-oxidizing insulating vapor, said electrode being held out of engagement with and at an angle between 5 degrees and the vertical.

4. The method of electric arc welding or brazing a joint which consists in establishing an electric arc between the material to be welded or brazed and an electrode comprising a metal rod covered with insulating material adapted to be converted by the arc into a non-oxidizing insulating vapor, moving said electrode along the joint and during such movement holding it out of engagement with the work and at an angle at which said arc is inclosed by said vapor.

5. The method of electric arc welding or brazing which consists in establishing an alternating current welding or brazing arc between the work to be welded or brazed and a movable electrode, said arc being inclosed in a non-oxidizing insulating vapor.

6. In an arc welding or brazing electrode, the combination of a metal rod, a coating of a different metal thereon and forming a tubular shell about said rod, and a covering over said coating adapted to produce a non-oxidizing insulating vapor when subjected to the arc.

7. In an arc welding or brazing electrode, the combination with a metal rod of a coating of a different metal thereon, said metal forming a tubular shell about said metal rod and being in contact therewith, and an insulating covering outside said rod and different metal, said covering being adapted to produce a non-oxidizing insulating vapor when subjected to the arc.

Signed at New York, in the county of New York and State of New York, this 17th day of July, A. D. 1915.

GEORGE W. CRAVENS.